US012666483B2

(12) United States Patent (10) Patent No.: US 12,666,483 B2

Sumita (45) Date of Patent: Jun. 23, 2026

(54) CONTROL METHOD, INFORMATION PROCESSING APPARATUS, AND COMPUTER-READABLE MEDIUM

(71) Applicant: Canon Kabushiki Kaisha, Tokyo (JP)

(72) Inventor: Chisei Sumita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 17/971,766

(22) Filed: Oct. 24, 2022

(65) Prior Publication Data

US 2023/0138231 A1 May 4, 2023

(30) Foreign Application Priority Data

Oct. 28, 2021 (JP) ................................. 2021-176825

(51) Int. Cl.
*H04W 76/18* (2018.01)
*H04W 48/20* (2009.01)

(52) U.S. Cl.
CPC ........... *H04W 76/18* (2018.02); *H04W 48/20* (2013.01)

(58) Field of Classification Search
CPC ..... H04W 76/18; H04W 48/20; H04B 17/318
See application file for complete search history.

(56) References Cited

U.S. PATENT DOCUMENTS 9,571,977 B2 * 2/2017 Kadous ................. H04W 4/023
10,264,523 B2 4/2019 Sumiuchi 10,425,889 B2 * 9/2019 Takeuchi ........... H04N 1/00307
11,089,638 B2 * 8/2021 Kim ....................... H04W 48/20
2011/0216692 A1 * 9/2011 Lundsgaard ........ H04W 36/304
370/328

(Continued)

FOREIGN PATENT DOCUMENTS

CN 105163372 A 12/2015
CN 108882343 A 11/2018

(Continued)

OTHER PUBLICATIONS

Japanese Office Action dated Jun. 16, 2025 in counterpart Japanese Patent Appln. No. 2021-176825.

(Continued)

*Primary Examiner* — Mohammad S Adhami
*Assistant Examiner* — Andrew Chanul Kim
(74) *Attorney, Agent, or Firm* — Venable LLP

(57) ABSTRACT

A control method for an information processing apparatus connectable with a communication apparatus and an access point is provided. The method comprises acquiring a first search result acquired via a search for access points performed by the communication apparatus or the information processing apparatus; attempting to establish a connection between a first access point, from access points and the information processing apparatus; attempting to establish a connection between a second access point, from the access points, to which the information processing apparatus has not attempted to establish a connection with, in a case in which establishing a connection with the first access point fails; and transmitting, to the communication apparatus, connection information for connecting to an access point corresponding to the connection established successfully.

19 Claims, 8 Drawing Sheets

(56)          References Cited

U.S. PATENT DOCUMENTS

| | | | | | |
|---|---|---|---|---|---|
| 2011/0286437 | A1* | 11/2011 | Austin | .............. | H04M 15/8271 |
| | | | | | 370/338 |
| 2017/0070951 | A1 | 3/2017 | Takeuchi | | |
| 2017/0199267 | A1* | 7/2017 | Bitra | .................... | H04W 64/00 |
| 2020/0077324 | A1* | 3/2020 | Choi | ................ | H04M 15/8044 |
| 2021/0377024 | A1* | 12/2021 | Shibata | ................... | H04L 63/08 |
| 2023/0362711 | A1* | 11/2023 | Bang | .................... | H04W 12/50 |

FOREIGN PATENT DOCUMENTS

| | | | |
|---|---|---|---|
| CN | 113031884 A | 6/2021 |
| JP | 2016-127545 A | 7/2016 |
| JP | 2018042280 A | 3/2018 |
| JP | 2020088567 A | 6/2020 |
| JP | 2021114695 A | 8/2021 |

OTHER PUBLICATIONS

Chinese Office Action dated Apr. 23, 2026 in counterpart Chinese Patent Appln. No. 2022113036415.

* cited by examiner

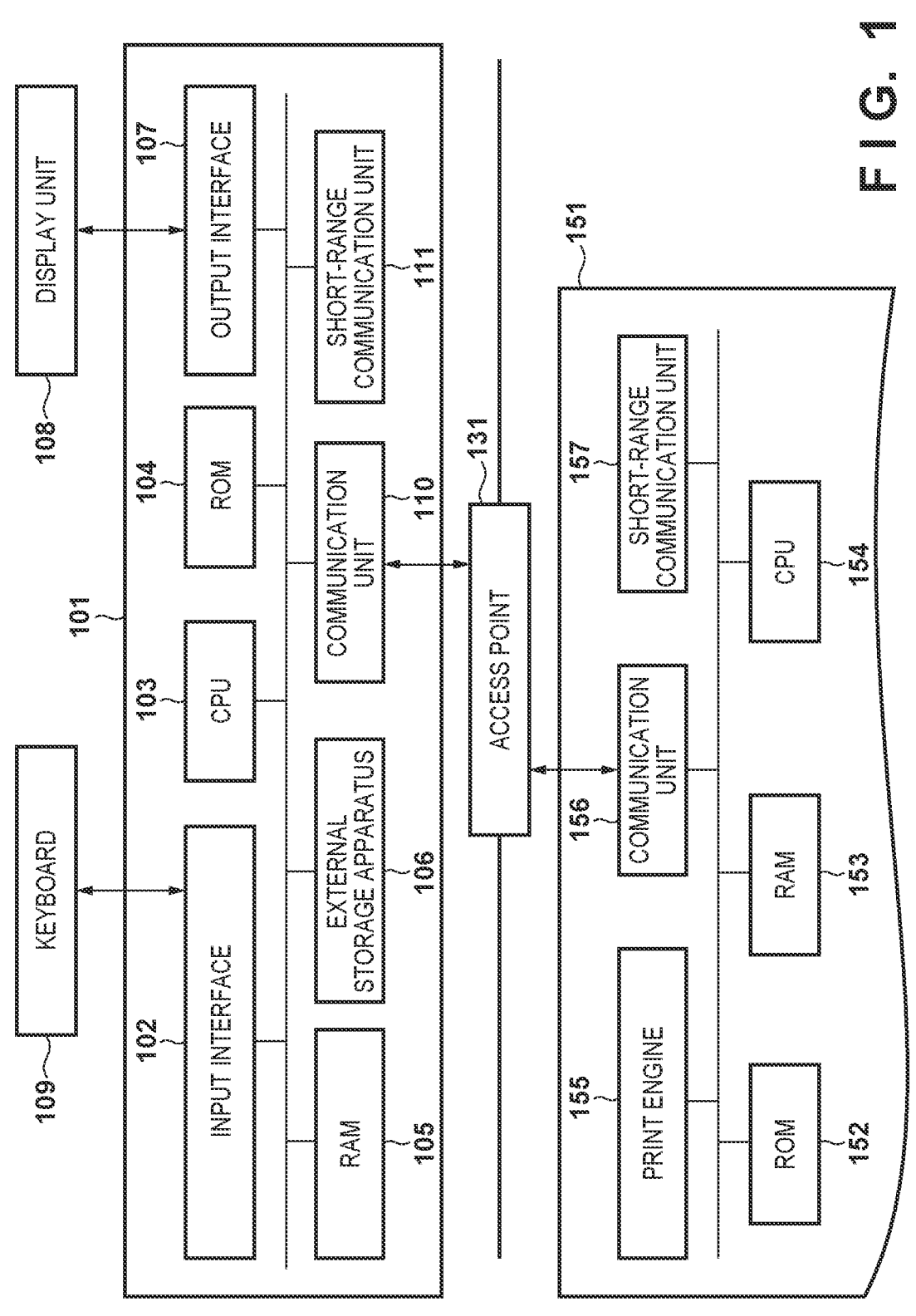
F I G. 1

F I G. 2
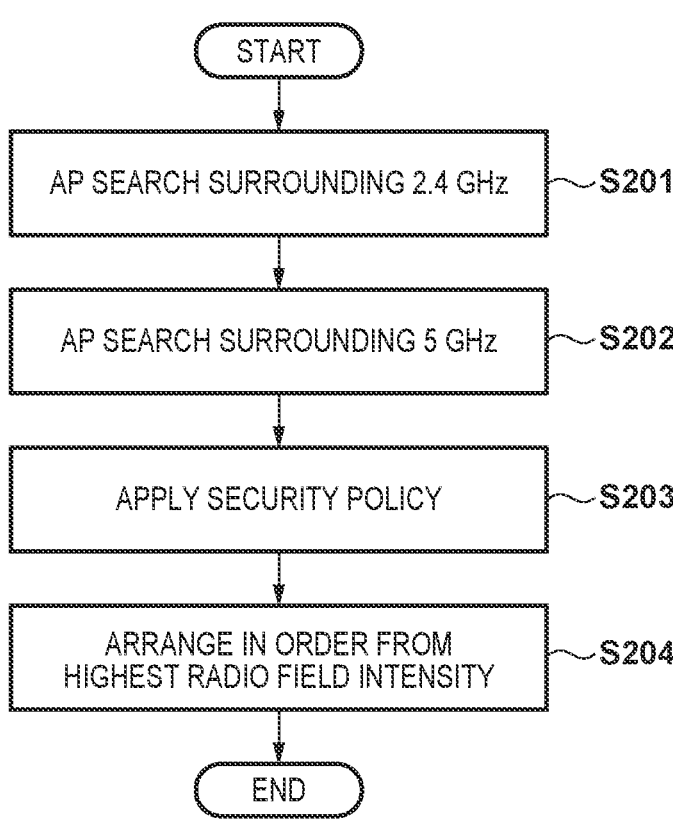
START
AP SEARCH SURROUNDING 2.4 GHz ～S201
AP SEARCH SURROUNDING 5 GHz ～S202
APPLY SECURITY POLICY ～S203
ARRANGE IN ORDER FROM
HIGHEST RADIO FIELD INTENSITY ～S204
END

F I G. 3A

| No. | SSID | FREQUENCY BAND | AUTHENTICATION METHOD | ENCRYPTION METHOD | MAC ADDRESS | RADIO FIELD INTENSITY | |
|---|---|---|---|---|---|---|---|
| 1 | abcde | 2.4GHz | WPA2-PSK | TKIP | 12:34:56:78:90:ab | 70 | 301 |
| 2 | fghijk | 2.4GHz | WPA2-PSK | AES | 34:56:78:90:ab:cd | 85 | 302 |
| 3 | lmnop | 2.4GHz | OPEN | WEP64 | 56:78:90:ab:cd:ef | 80 | 303 |
| 4 | qrstu | 5GHz | WPA3-PSK | AES | 11:22:33:44:55:66 | 90 | 304 |
| 5 | vwxyz | 5GHz | OPEN | WEP128 | 77:88:99:00:aa:bb | 65 | 305 |
| 6 | aaaaa | 5GHz | WPA2-PSK | AES | 12:34:56:11:22:33 | 55 | 306 |

F I G. 3B

| No. | SSID | FREQUENCY BAND | AUTHENTICATION METHOD | ENCRYPTION METHOD | MAC ADDRESS | RADIO FIELD INTENSITY | |
|---|---|---|---|---|---|---|---|
| 4 | qrstu | 5GHz | WPA3-PSK | AES | 11:22:33:44:55:66 | 90 | 304 |
| 2 | fghijk | 2.4GHz | WPA2-PSK | AES | 34:56:78:90:ab:cd | 85 | 302 |
| 1 | abcde | 2.4GHz | WPA2-PSK | TKIP | 12:34:56:78:90:ab | 70 | 301 |
| 6 | aaaaa | 5GHz | WPA2-PSK | AES | 12:34:56:11:22:33 | 55 | 306 |

F I G. 4

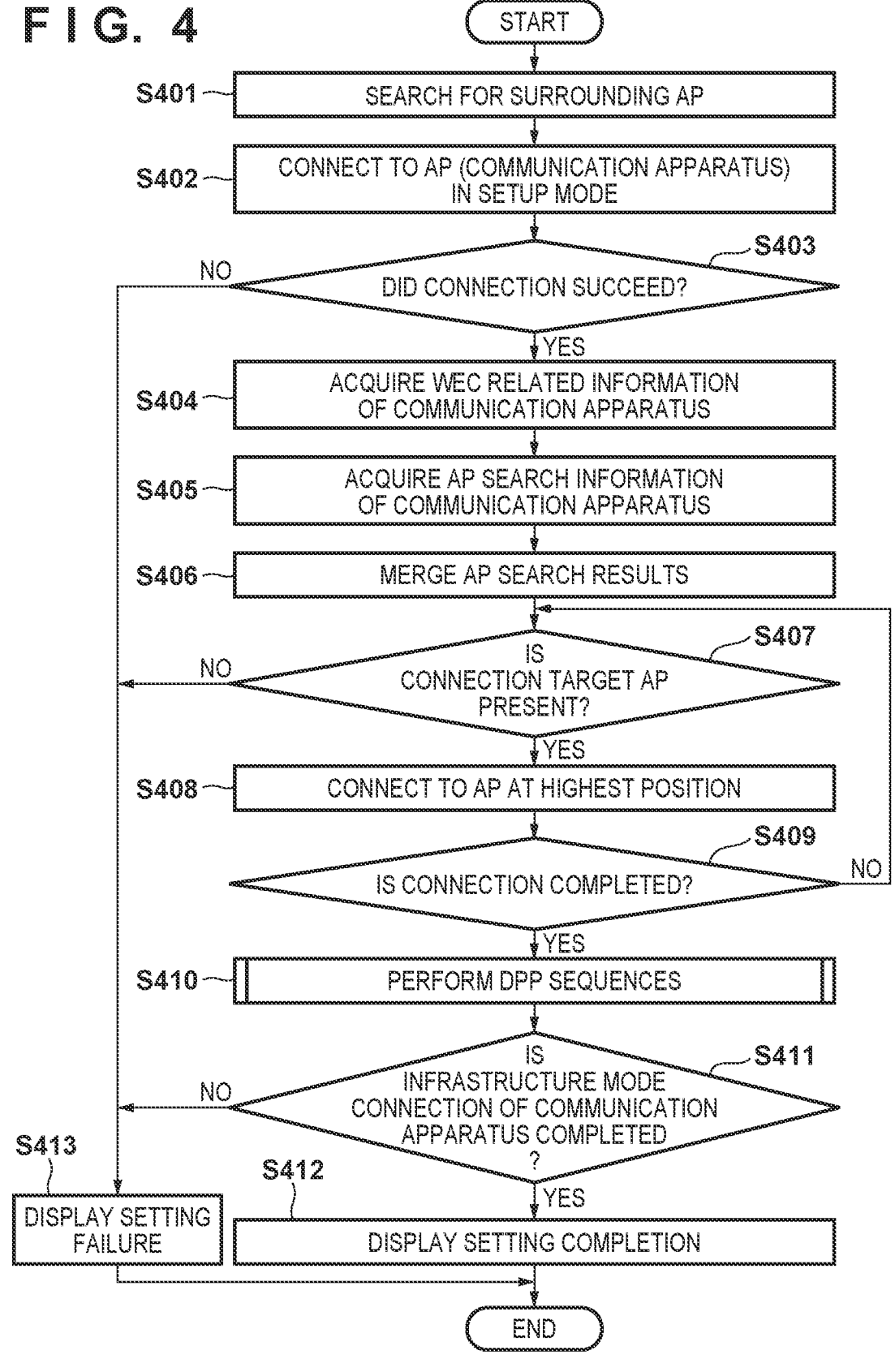

START

S401 — SEARCH FOR SURROUNDING AP

S402 — CONNECT TO AP (COMMUNICATION APPARATUS) IN SETUP MODE

S403 — DID CONNECTION SUCCEED?

NO

YES

S404 — ACQUIRE WEC RELATED INFORMATION OF COMMUNICATION APPARATUS

S405 — ACQUIRE AP SEARCH INFORMATION OF COMMUNICATION APPARATUS

S406 — MERGE AP SEARCH RESULTS

S407 — IS CONNECTION TARGET AP PRESENT?

NO

YES

S408 — CONNECT TO AP AT HIGHEST POSITION

S409 — IS CONNECTION COMPLETED?

NO

YES

S410 — PERFORM DPP SEQUENCES

S411 — IS INFRASTRUCTURE MODE CONNECTION OF COMMUNICATION APPARATUS COMPLETED ?

NO

YES

S413 — DISPLAY SETTING FAILURE

S412 — DISPLAY SETTING COMPLETION

END

F I G. 5
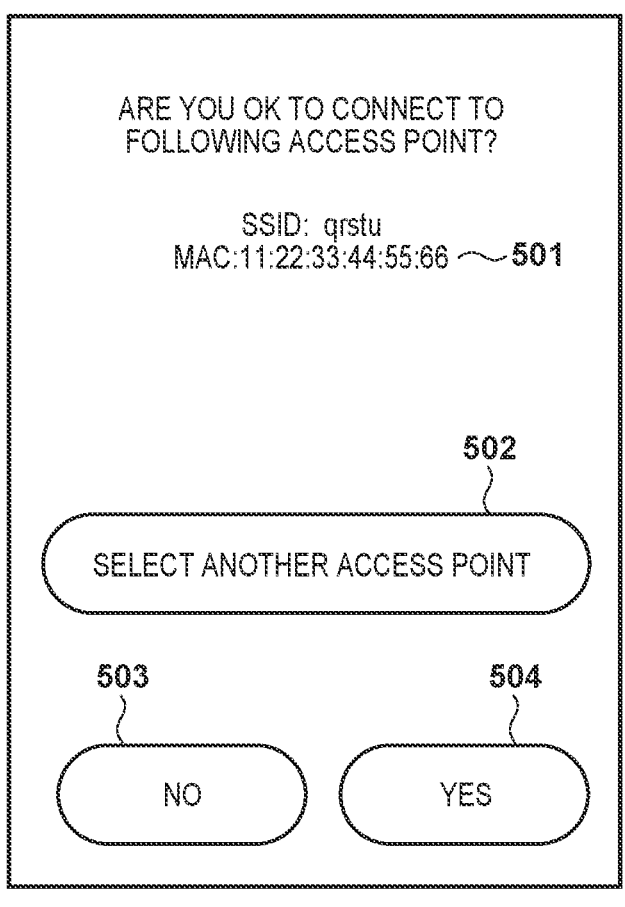

F I G. 7

| UUID | CONTENTS | R/W ATTRIBUTE | ENCRYPTION | VALUE | |
|---|---|---|---|---|---|
| 00405f9b34fb | WEC RELATED INFORMATION | Read | ○ | (PUBLIC KEY, ETC.) | 701 |
| 00405f9b34fc | STA STATE | Read | — | (idle) | 702 |
| 00405f9b34fd | DPP TRANSITION REQUEST | Write | ○ | (Start) | 703 |
| 00405f9b34fe | CONNECTION STATE | Read | — | (idle) | 704 |
| 00405f9b34ff | AP SEARCH RESULT | Read | — | (AP SEARCH RESULT) | 705 |
| 00405f9b34fb | WEC RELATED INFORMATION | Read | ○ | (PUBLIC KEY, ETC.) | |

CONTROL METHOD, INFORMATION PROCESSING APPARATUS, AND COMPUTER-READABLE MEDIUM

BACKGROUND OF THE INVENTION

Field of the Invention

The present invention relates to a control method, an information processing apparatus, and a computer-readable medium.

Description of the Related Art

Known technology (for example, see Japanese Patent Laid-Open No. 2016-127545) includes an information processing apparatus such as a personal computer (PC) that transmits information relating to an access point to a communication apparatus such as a printer with a communication function to connect the communication apparatus and the access point.

However, with this function for connecting a communication apparatus and an access point by transmitting connection information for connecting to the access point to the communication apparatus becoming more common, there is a demand for an improvement to the user-friendliness of this function.

SUMMARY OF THE INVENTION

The present invention improves the user-friendliness of a function for connecting a communication apparatus and an access point.

The present invention has the following configuration for achieving the object described above. According to one aspect of the present invention, provided is a control method for an information processing apparatus capable of communicating with a communication apparatus and an access point, comprising: acquiring a first search result, which is a result acquired via a search for access points performed by the communication apparatus or the information processing apparatus; attempting to establish a connection between a first access point, from among a plurality of access points including the first search result, and the information processing apparatus; attempting to establish a connection between a second access point, from among the plurality of access points, to which the information processing apparatus has not attempted to establish a connection with, in a case in which establishing a connection with the first access point fails; and transmitting, to the communication apparatus, connection information for connecting to an access point corresponding to the connection established successfully.

According to another aspect of the present invention, provided is an information processing apparatus capable of communicating with a communication apparatus and an access point, comprising: at least one processor; and at least one memory comprising at least one program, wherein the at least one program is configured to cause the at least one processor to perform: acquiring a first search result, which is a result acquired via a search for access points performed by the communication apparatus or the information processing apparatus, attempting to establish a connection between a first access point, from among a plurality of access points including the first search result, and the information processing apparatus, attempting to establish a connection between a second access point, from among the plurality of access points, to which the information processing apparatus has not attempted to establish a connection with, in a case in which establishing a connection with the first access point fails, and transmitting, to the communication apparatus, connection information for connecting to an access point corresponding to the connection established successfully.

According to still another aspect of the present invention, provided is a non-transitory computer-readable medium storing at least one program, wherein the program causes a computer capable to communicating with a communication apparatus and an access point to acquire a first search result, which is a result acquired via a search for access points performed by the communication apparatus or the information processing apparatus, attempt to establish a connection between a first access point, from among a plurality of access points including the first search result, and the information processing apparatus, attempt to establish a connection between a second access point, from among the plurality of access points, to which the information processing apparatus has not attempted to establish a connection with, in a case in which establishing a connection with the first access point fails, and transmit, to the communication apparatus, connection information for connecting to an access point corresponding to the connection established successfully.

According to the present invention, the user-friendliness of a function for connecting a communication apparatus and an access point can be improved.

Further features of the present invention will become apparent from the following description of exemplary embodiments with reference to the attached drawings.

BRIEF DESCRIPTION OF THE DRAWINGS

FIG. 1 is a diagram illustrating the configuration of an information processing apparatus and a communication apparatus.

FIG. 2 is a flowchart illustrating AP search processing executed by the communication apparatus.

FIG. 3A is a diagram illustrating an example of results of an AP search executed by the communication apparatus.

FIG. 3B is a diagram illustrating an example of results of an AP search executed by the communication apparatus.

FIG. 4 is a flowchart illustrating the processing executed by the information processing apparatus.

FIG. 5 is a diagram illustrating an example of a WEC start screen.

FIG. 7 is a diagram illustrating an example of the GATT database provided in the communication apparatus.

DESCRIPTION OF THE EMBODIMENTS

Figure 6:
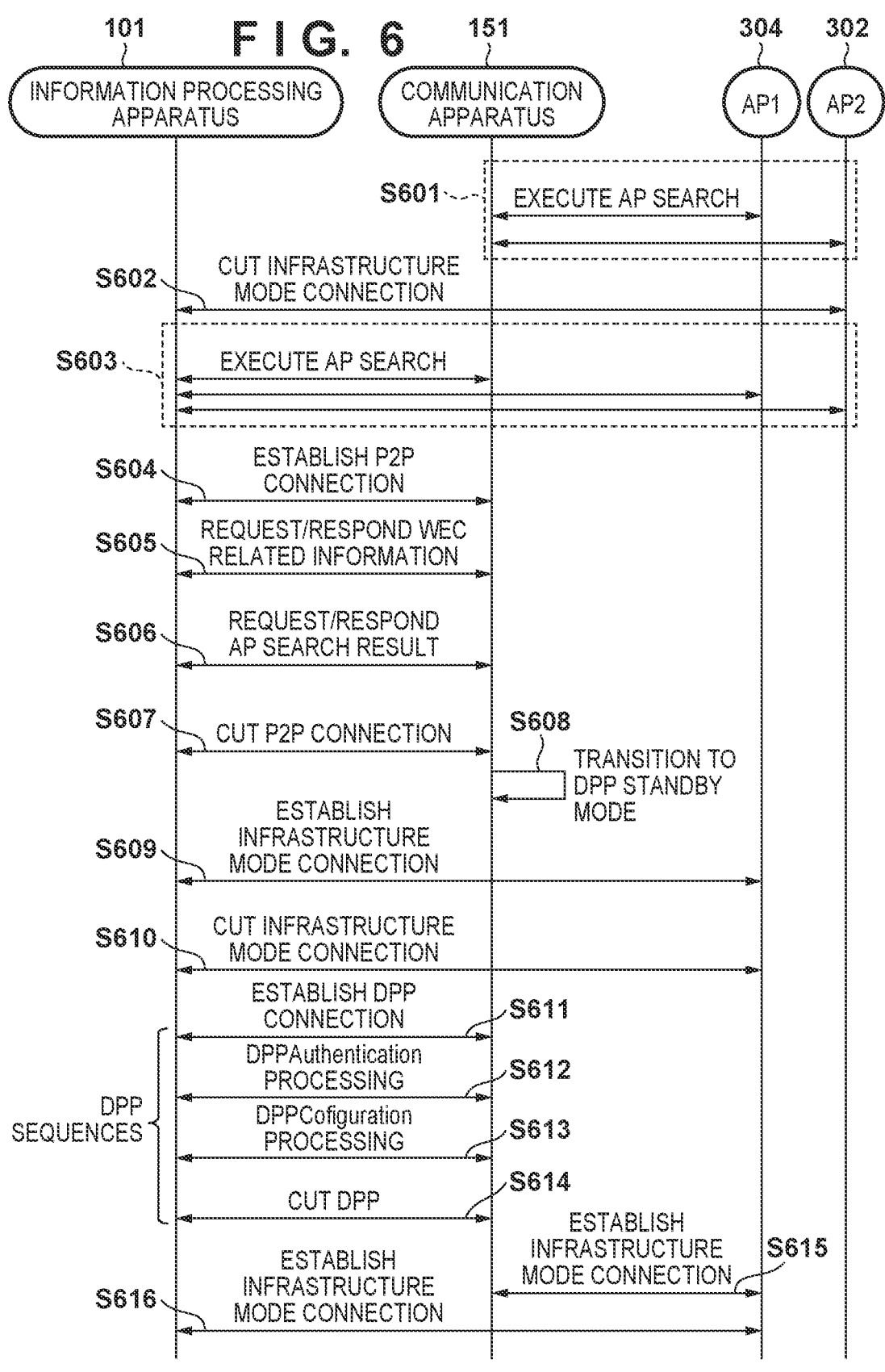
FIG. 6 is a sequence diagram illustrating the processing executed by the information processing apparatus and the communication apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An information processing apparatus and a communication apparatus included in a communication system and a control method of the information processing apparatus of the present embodiment will now be described. In the present embodiment, a smart phone is used as an example of the information processing apparatus, but no such limitation is intended. It is sufficient that the apparatus is provided with an information processing function, a communication function, and a user interface function described in the present embodiment. For example, the communication function includes a short-range communication (NFC) function or a Bluetooth (registered trademark) function for directly (via peer-to-peer (P2P) communicating with the communication apparatus. Various devices can be used for the information processing apparatus including a portable terminal, a PC, a tablet terminal, a personal digital assistant (PDA), a digital camera, and the like.

Also, in the present embodiment, a printer is used as an example of the communication apparatus, but no such limitation is intended. Various devices can be used as long as the apparatus is capable of wirelessly communicating with the information processing apparatus. The communication apparatus is not required to be provided with a user interface but is provided with a function, such as an NFC function or a Bluetooth (registered trademark) function, for directly communicating with the information processing apparatus. In a case in which the communication apparatus is a printer, there are no conditions on image forming method, and an inkjet printer, a full-color laser printer, a monochrome printer, or the like can be used. Also, the communication apparatus can be not only a printer but may be a copy machine or a facsimile machine, a portable terminal, a smart phone, a notebook PC, a tablet terminal, a PDA, a digital camera, a music playback device, a television, a smart speaker, or the like. A multi-function peripheral provided with a plurality of functions, such as a copying function, a FAX function, a printing function, and the like, may also be used.

Also, in the present embodiment, in a case in which the information processing apparatus supports the function known as WirelessFidelity (Wi-Fi (registered trademark)) Easy Connect (hereinafter, referred to as WEC), the information processing apparatus is capable of executing this function. WEC refers to a function for executing network setup of another apparatus from the information processing apparatus using the Device Provisioning Protocol (hereinafter, referred to as DPP) established by the Wi-Fi (registered trademark) Alliance. Note that this other apparatus is the communication apparatus described above, and network setup specifically means processing to connect this other apparatus to an access point forming the network. With WEC, communication is performed between an apparatus (hereinafter, referred to as a configurator apparatus) that operates with the role of a configurator and an apparatus (hereinafter, referred to as an enrollee apparatus) that operates with the role of an enrollee. The information processing apparatus described above corresponds to the configurator apparatus, and the communication apparatus corresponds to the enrollee apparatus.

The configurator apparatus acquires bootstrapping information from the enrollee apparatus. The bootstrapping information includes, for example, identification information (MAC address and the like) of the enrollee apparatus, public key information used for securely communicating with the enrollee apparatus, and the like. In the present embodiment, the bootstrapping information is described as WEC related information. Note that other information may also be treated as WEC related information. Note that the bootstrapping information is not required to be acquired from the enrollee apparatus. For example, the bootstrapping information may be encoded on a label attached to the enrollee apparatus or the like and optically read or may be stored on a wireless tag and electronically read. Alternatively, the bootstrapping information may be acquired from a server associated with and registered with the enrollee apparatus or may be manually input.

Also, the configurator apparatus uses the acquired bootstrapping information to perform wireless communication with the enrollee apparatus. Specifically, for example, the configurator apparatus encrypts a protocol key using the public key included in the bootstrapping information and transmits the encrypted protocol key to the enrollee apparatus. Then, a common key is created on the basis of the encrypted protocol key. The configurator apparatus transmits the information encrypted using the common key to the enrollee apparatus. Note that herein, the information transmitted is specifically connection information for connecting to an access point, for example. Then, the enrollee apparatus establishes a wireless connection with the access point using the connection information received from the configurator apparatus. The process described above is a general outline of the process specified as WEC and DPP. Note that in the network setup processing via WEC according to the present embodiment described herein, the information processing apparatus that supports WEC operates as the configurator apparatus, and the communication apparatus that supports WEC operates as the enrollee apparatus.

First, the configuration of the information processing apparatus of the present embodiment and the configuration of the communication apparatus capable of communicating with the information processing apparatus of the present embodiment will be described with reference to the block diagram of FIG. 1. Also, the configuration described below is an example of the present embodiment, but the present embodiment may be applied to any apparatus capable of communicating with a communication apparatus and is not particularly limited to the illustrated functions.

Configuration of Information Processing Apparatus

An information processing apparatus 101 is an information processing apparatus of the present embodiment. The information processing apparatus 101 includes an input interface 102, a CPU 103, a ROM 104, a RAM 105, an external storage apparatus 106, an output interface 107, a display unit 108, a communication unit 110, a short-range communication unit 111, and the like. The computer of the information processing apparatus 101 is formed by the CPU 103, the ROM 104, the RAM 105, and the like.

The input interface 102 is an interface for accepting data input and operation instruction from the user via the operation of a console unit such as a keyboard 109 or the like. Note that the console unit may be a physical keyboard, a physical button, or the like, may be integrally formed with the display unit 108, and in particular may be a software keyboard, software button, or the like displayed on the display unit 108. In other words, the input interface 102 may accept input from the user via the display unit 108.

The CPU 103 is a system control unit that controls the entire information processing apparatus 101. The ROM 104 stores fixed data, such as a control program executed by the CPU 103, data tables, a built-in operating system (hereinafter referred to as OS) program, and the like. In the present embodiment, the respective control programs stored in the ROM 104 controls the execution of software, such as scheduling, task switching, and interrupt processing, under the management of the built-in OS stored in the ROM 104.

The RAM 105 is constituted by a static random-access memory (SRAM) and the like that requires a backup power supply. Note that because the RAM 105 stores the data via a non-illustrated primary cell for data backup, the data required for program controlled variables and the like can be stored without volatilization. Also, the RAM 105 is also provided with a memory area for storing setting information of the information processing apparatus 101, management data of the information processing apparatus 101, and the like. The RAM 105 is also used as the main memory and the working memory of the CPU 103.

The external storage apparatus 106 stores an application program (hereinafter, referred to as a setting application) for executing the network setup of a communication apparatus 151, a printing information creation program for creating printing information able to be interpreted by the communication apparatus 151, and the like. The setting application is an application program for setting the settings of the connection destination access point of the communication apparatus 151 using WEC or the like. Note that the setting application may be provided with another function other than the network setup function. For example, the setting application may be provided with a function for causing the communication apparatus 151 to execute printing, a function for causing the communication apparatus 151 to scan a set document, a function for confirming the state of the communication apparatus 151, and the like. The setting application, for example, is stored in the external storage apparatus 106 by being installed from an external server using internet communication via the communication unit 110. Also, the external storage apparatus 106 stores the various types of programs, such as an information transceiving control program for transceiving with the communication apparatus 151 connected via the communication unit 110, and various types of information used by the programs.

The output interface 107 is an interface for performing control for the display unit 108 to display data and communicate the state of the information processing apparatus 101.

The display unit 108 is constituted by a light-emitting diode (LED), a liquid crystal display (LCD), or the like and displays data and communicates the state of the information processing apparatus 101. The display unit 108 constitutes the user interface together with the keyboard 109 and the touch panel.

The communication unit 110 is configured to connect to an apparatus, such as the communication apparatus 151 or an access point 131 and perform data communication. For example, the communication unit 110 is capable of connecting to an access point (not illustrated) inside the communication apparatus 151. By connecting the communication unit 110 and an access point inside the communication apparatus 151, the information processing apparatus 101 and the communication apparatus 151 are able to communicate with one another. Note that the communication unit 110 may communicate directly with the communication apparatus 151 via wireless communication or may communicate via an external apparatus located outside of the information processing apparatus 101 and the communication apparatus 151. Note that the external apparatus includes an external access point (the access point 131 or the like) or an apparatus capable of relaying communications other than an access point located outside of the information processing apparatus 101 and outside of the communication apparatus 151. In the present embodiment, the wireless communication method used by the communication unit 110 is Wi-Fi (registered trademark) which is a communication standard compliant with the IEEE 802.11 series. Also, the WEC described above is performed by communication via the communication unit 110. Examples of the access point 131 include, for example, a wireless LAN router, a wireless LAN access point, and other similar devices. Note that in the present embodiment, the method of connecting the information processing apparatus 101 and the communication apparatus 151 directly without using an external access point is referred to as a direct connection or a P2P connection method. Also, the method of connecting the information processing apparatus 101 and the communication apparatus 151 via an external access point is referred to as an infrastructure mode connection method. Both of these connection methods are also referred to as modes.

The short-range communication unit 111 is configured to wirelessly connect at short distances to an apparatus such as the communication apparatus 151 and perform data communication and perform communication using a communication method other than via the communication unit 110. The short-range communication unit 111 is capable of connecting to a short-range communication unit 157 inside the communication apparatus 151, for example. Examples of the communication method include, for example, NFC, Bluetooth (registered trademark) Classic, Bluetooth Low Energy (BLE), Wi-Fi Aware, and the like.

In the present embodiment, the information processing apparatus 101 performs WEC using the OS of the information processing apparatus 101 on the basis of an instruction to execute network setup processing by the setting application. The OS of the information processing apparatus 101 is provided with a method of storing connection information, such as an SSID and a password, for the communication device already connected, and the setting application is capable of acquiring a communication device information list with the connection information already stored. The setting application is capable of instructing the OS to connect to a specific communication device, and the OS performs connection with the device whose connection information has been stored in the OS on the basis of the stored connection information. In a case in which the OS fails to connect to the device whose connection information has been stored in the OS or in a case in which the OS connects to a device whose connection information has been stored in the OS, the user is prompted to enter connection information such as a password, and then connection is attempted using the entered information. In a case in which, as a function of the OS, the OS does not accept connection from the setting application described above directly to a communication device, the setting application presents to the user information such as the SSID of the connection destination and prompts the user to use the connection setting for the presented communication device to establish a desired connection.

Configuration of Communication Apparatus

The communication apparatus 151 is a communication apparatus of the present embodiment. The communication apparatus 151 includes a ROM 152, a RAM 153, a CPU 154, a print engine 155, a communication unit 156, the short-range communication unit 157, and the like. The computer of the communication apparatus 151 is formed by the ROM 152, the RAM 153, the CPU 154, and the like.

The communication unit 156 includes, as an access point inside the communication apparatus 151, an access point for connecting to an apparatus such as the information processing apparatus 101. Note that this access point is capable of connecting to the communication unit 110 of the information processing apparatus 101. By the communication unit 156 enabling this access point, the communication apparatus 151 is able to operate as an access point. Note that the communication unit 156 may be directly wirelessly connected to the information processing apparatus 101 or wirelessly connected via the access point 131. In the present embodiment, the wireless communication method used by the communication unit 156 is a communication standard compliant with the IEEE 802.11 series. Hereinafter, Wi-Fi (registered trademark) is used as the communication standard compliant with the IEEE 802.11 series. Also, in a case in which the communication apparatus 151 supports WEC, the WEC described above is performed via communications by the communication unit 156. Also, the communication unit 156 may be provided with hardware that functions as an access point or may operate as an access point via software for causing it to function as an access point.

The communication apparatus 151 of the present embodiment is capable of operating in an infrastructure mode and a P2P mode as the mode for communicating using the communication unit 156.

Infrastructure mode is a mode in which the communication apparatus 151 communicates with another apparatus such as the information processing apparatus 101 via an external apparatus (for example, the access point 131) that forms a network. Connection to an external access point established by the communication apparatus 151 operating in infrastructure mode is referred to as an infrastructure mode connection. In the present embodiment, with an infrastructure mode connection, the communication apparatus 151 operates as the slave station and the external access point operates as the master station. Note that in the present embodiment, a master station is an apparatus that sets the communication channel used by the network the master station belongs to, and a slave station is an apparatus that does not set the communication channel used by the network the slave station belongs to and uses the communication channel set by the master station.

P2P mode is a mode in which the communication apparatus 151 communicates directly with another apparatus such as the information processing apparatus 101 without using an external apparatus that forms a network. In the present embodiment, P2P mode includes AP mode in which the communication apparatus 151 operates as an access point. The connection information (SSID or password) of the access point enabled inside the communication apparatus 151 when in AP mode is able to be discretionarily set by the user. Note that P2P mode may also include, for example, WFD mode for the communication apparatus 151 to communicate via Wi-Fi Direct (WFD). Note that which of the plurality of WFD compatible devices operates as the master station is determined in accordance with a sequence called the Group Owner Negotiation, for example. Note that the master station may be determined without using the Group Owner Negotiation. A WFD compatible device that can function as the master station is in particular referred to as a group owner. A direct connection to another apparatus established via the communication apparatus 151 operating in P2P mode is referred to as a direct connection. In the present embodiment, with a direct connection, the communication apparatus 151 operates as the master station and another apparatus operates as the slave station.

Also, in the present embodiment, when a predetermined operation from the user is accepted, the communication apparatus 151 can operate in network setup mode, which is a mode for the communication apparatus 151 to perform network setup. When the communication apparatus 151 is in a state without the network settings being set and the power is turned on, it can automatically start up in the network setup mode to achieve the effect of the embodiment. In a case in which the communication apparatus 151 operates in network setup mode, by using the communication unit 156, the communication apparatus 151 operates effectively as an access point for setup during network setup mode. The access point for setup is an access point different from the access point enabled when in the AP mode described above. Also, the SSID of the access point for setup includes a predetermined character string that the setting application of the information processing apparatus 101 is able to recognize. The access point for setup is also an access point that does not require a password for connection. Also, the communication apparatus 151 operating in network setup mode uses a predetermined communication protocol (communication protocol for setup) when communicating with the information processing apparatus 101 connected to the access point for setup. The communication protocol for setup is specifically the Simple Network Management Protocol (SNMP), for example.

After the communication apparatus 151 starts operating in network setup mode, when a predetermined amount of time elapses, the communication apparatus 151 stops operating in network setup mode and disables the access point for setup. This is because, with the access point for setup being an access point that does not require a password as described above, the possibility of a connection request from a non-appropriate apparatus increases when it is enabled for a long period of time. Note that the access point for setup may be an access point that requires a password. In this case, the password used to connect to the access point for setup is a fixed (cannot be changed by the user) password determined in advance by the setting application.

The short-range communication unit 157 is configured to wirelessly connect at short distances to an apparatus such as the information processing apparatus 101 and is capable of connecting to the short-range communication unit 111 inside the information processing apparatus 101, for example. Examples of the communication method include, for example, NFC, Bluetooth Classic, BLE, Wi-Fi Aware, and the like.

The RAM 153 is constituted by an SRAM and the like that requires a backup power supply. Note that because the RAM 153 stores the data via a non-illustrated primary cell for data backup, the data required for program controlled variables and the like can be stored without volatilization. The RAM 153 is also provided with a memory area for storing setting information of the communication apparatus 151, management data of the communication apparatus 151, and the like. Also, the RAM 153 is used as the main memory and the working memory of the CPU 154 and stores a receiving buffer for temporarily storing the printing information received from the information processing apparatus 101 or the like and various types of information.

The ROM 152 stores fixed data, such as a control program executed by the CPU 154, data tables, an OS program, and the like. In the present embodiment, the respective control programs stored in the ROM 152 controls the execution of software, such as scheduling, task switching, and interrupt processing, under the management of the built-in OS stored in the ROM 152.

The CPU 154 is a system control unit that controls the entire communication apparatus 151. The CPU 154 executes a program stored in the ROM 152 or the RAM 153, performs communications, creates data, performs editing, and the like.

An image is formed on a printing medium by adding a printing agent such as ink on a printing medium such as paper on the basis of information stored in the print engine 155, the RAM 153 or a print job received from the information processing apparatus 101, and the printing result is output. Note that typically, when the data amount of the print job transmitted from the information processing apparatus 101 or the like is large, a communication method capable of high speed communication is required to be used for communication of the print job. Thus, the communication apparatus 151 receives the print job via the communication unit 156, which is capable of communication at higher speeds than the short-range communication unit 157.

Note that the communication apparatus 151 may be installed with a memory, such as an external HDD. SD card, or the like, as an optional device, and the information stored in the communication apparatus 151 may be stored on this memory.

Network Setup Processing

The processing for executing the network setup processing of the communication apparatus 151 from the information processing apparatus 101 of the present embodiment will be described below using the drawings.

Access Point Search Processing

FIG. 2 is a flowchart illustrating the flow of an access point search (hereinafter, referred to as AP search) executed by the information processing apparatus 101 and the communication apparatus 151 when network setup processing is executed or as pre-preparation therefor. The processing of FIG. 2 may be periodically executed in advance, for example, but, in the present example is executed during the processing of FIG. 4 described below.

After the AP search starts, in step S201, surrounding access points are searched for by receiving beacon information periodically transmitted by a surrounding 2.4 GHz band access point. The beacon information includes information including an SSID of each access point, an authentication method, an encryption method, a MAC address, and radio field intensity measured from the received power. Next, in step S202, as in step S201, surrounding 5 GHz band access points are searched for. Each communication terminal, such as the information processing apparatus 101 and the communication apparatus 151, is set with a security policy to ensure the security of the communication and user-friendliness. Specifically, restrictions including not connecting to a device for which authentication is not provided or considered to have a vulnerable encryption system and not connecting to a 2.4 GHz band device may be set by the user using the terminal. In step S203, processing is executed to compare the security policy with the information of the access point searched for in steps S201 and S202 and remove devices not to be connected to from the list. Next in step S204, the radio field intensity of the information of the access points remaining in the list are referenced, and processing to arrange the access points in order from the highest intensity.

FIGS. 3A and 3B are diagrams illustrating examples of the results of AP searches executed by the communication apparatus 151 as described using FIG. 2. FIG. 3A illustrates the AP search results after steps S201 and S202 of FIG. 2 have been performed, and 2.4 GHz band access points 301, 302, and 303 and 5 GHz band access points 304, 305, and 306 have been discovered. In this example, the communication apparatus 151 is set with a security policy that does not allow connection to an AP with WEP specified as the encryption method. Because the access points 303 and 305 are set with WEP64 and WEP128 are the encryption method, when these access points are compared to the security policy in the processing of step S203, they are removed from the connection target list as being devices not to connect to. For example, access points that are determined to have a vulnerable (in other words, no security) security (safety) in terms of the authentication method or encryption method are determined to be devices not to connect to. The criterion for determining vulnerability may be determined by setting in advance vulnerable authentication methods and encryption methods or by alternatively setting in advance authentication methods and encryption methods that are not vulnerable. Vulnerability may be determined by checking the criterion. Also, in the processing of step S204, the radio field intensity of the devices remaining in the list is referenced, and the devices are rearranged in order from the largest value making the order 304, 302, 301, and 306, converting them to AP search result illustrated in FIG. 3B. In this manner, by executing the AP search processing described using FIGS. 2, 3A, and 3B, the communication terminal can search for the optimal access point in terms of being compatible with the security policy and having good communication.

Network Setup Processing by Information Processing Apparatus

FIG. 4 is a flowchart illustrating the flow of the processing executed by the information processing apparatus 101 in the network setup processing of the present embodiment. The flowchart illustrated in FIG. 4 is implemented by the setting application stored in the ROM 104 or the external storage apparatus 106 being read out onto the RAM 105 and executed by the CPU 103. Also, the flowchart illustrated in FIG. 4 is started in response to a predetermined operation for network setup performed on the screen displayed by the setting application.

When the setting application is started up by an operation by the user of the information processing apparatus 101, in step S401, in order to search for surrounding access points, the AP search illustrated in FIG. 2 described above is performed and the result is stored. Next, in step S402, from the results of the AP search, the communication apparatus 151 in the network setup mode described above, in other words, the access point for setup, is detected, and a connection to the detected access point for setup is attempted. In step S403, the connection success of P2P communication with the communication apparatus 151 is confirmed, and in a case in which the connection fails, in step S413, that setting failed is displayed and the processing ends. In a case in which the connection with the communication apparatus 151 in step S403 is a success, in step S404, the WEC related information of the communication apparatus 151 is acquired via SNMP. Also, in step S405, the AP search information of the communication apparatus 151 is acquired via SNMP. In the communication apparatus 151, when network setup mode is activated, the AP search described using FIG. 2 is performed and a list of optimal access points as illustrated in FIG. 3B is stored. The AP search processing in the communication apparatus 151 may be performed when an information request from the information processing apparatus 101 in step S405 is performed instead of when the network setup mode is activated and the effect of the present example can still be achieved.

In step S405, when the AP search information of the communication apparatus 151 is acquired, the processing proceeds to step S406, and the connection candidate list of FIG. 3B presented by the communication apparatus 151 and the results of the AP search performed in step S401 by the information processing apparatus 101 are merged. Merge here means first comparing the connection candidate list acquired from the communication apparatus 151 and the results of the AP search performed by the information processing apparatus 101. Then, as a result of the comparison, non-matches are removed from the connection candidate list of FIG. 3B. In other words, a connection candidate list of access points in the connection candidate list acquired by the communication apparatus 151 that are also included in the AP search results acquired by the information processing apparatus 101 is created. Herein, this processing is referred to as merging. When step S406 is executed, the access points that the information processing apparatus 101 and/or the communication apparatus 151 can connect to can be narrowed down to the access point 131 which is a connection target for both. Note that in the connection candidate list acquired in step S406, the access points are sorted in order of signal strength with respect to the communication apparatus 151. In the present example, no access points are removed.

Next, when the connection candidate list is created via step S406, in step S407, the information processing apparatus 101 confirms whether the access point 131 which is a connection target is present. In other words, whether there is at least one access point in the connection candidate list is determined. In a case in which the access point 131 which is a connection target is not present, in step S413, that the setting failed is displayed and the processing ends. In a case in which, in step S407, an AP which is a connection target is present, the processing proceeds to step S408, and user confirmation is acquired to connect to the access point 131 that is at the highest position in the connection candidate list. Then, in a case in which confirmation is acquired, the information processing apparatus 101 attempts to establish a connection between the access point 131 and the information processing apparatus 101. The method of user confirmation of the access point 131 which is a connection target is described below using FIG. 5. Next, in step S409, it is determined whether or not the connection with the access point 131 for which connection was attempted has completed (whether or not a connection between the access point 131 and the information processing apparatus 101 has been established). Connection completion is determined on the basis of a response from the access point. In some cases, a negative response to the connection may be received or the response may timeout. However, in such cases, connection attempts may be made by repeatedly retrying depending on the cause (error state) of connection failure, such as a wrong password. When connection failure is confirmed in step S409, the access point 131 that was attempted to connect to is removed (not illustrated) from the connection target list. Then, the processing returns to step S407, and a connection to the next connection target access point on the updated list is attempted.

When connection to the desired access point 131 is completed in step S409, connection to the connected access point 131 is temporarily cut (not illustrated), and then in step S410, a series of DPP sequences are performed on the basis of the WEC related information acquired from the communication apparatus 151. The DPP sequences will be described below in detail, but here, the information processing apparatus 101 performs a connection using the method specified in the WEC related information by the communication apparatus 151 and executes processing to communicate the connection method to the optimal access point 131 confirmed by the foregoing steps.

When the DPP sequence of step S410 ends, the information processing apparatus 101 reconnects (not illustrated) to the access point 131 that temporarily completed connection in step S409, and the processing proceeds to step S411. Here, whether or not the infrastructure mode connection between the connected access point 131 and the communication apparatus 151 is complete is determined. The connection completion confirmation method can be implemented by confirming the presence of the communication apparatus 151 via the access point 131. In step S411, in a case in which a connection between the communication apparatus 151 and the access point 131 cannot be confirmed, in step S413, that the setting failed is displayed and the processing ends. In step S411, in a case in which connection with the communication apparatus 151 via the access point 131 is confirmed to be completed, that setting is complete is displayed (S412) and the processing ends.

By executing the processing described above, the setting application of the information processing apparatus 101 can perform connection setting with the access point 131 that is optimal from the perspective of the communication apparatus 151.

FIG. 5 is a diagram illustrating an example of a screen display on the display unit 108 of the information processing apparatus 101 for asking the user to grant permission to connect to the access point 131, with the connection candidate list described in step S408 of FIG. 4 being in the state illustrated in FIG. 3B. The SSID and a MAC address of the SSID "qrstu" 304, which is the optimal access point 131 in the connection candidate list of FIG. 3B are displayed as a connection target 501, and the user is asked to grant permission to connect. When the user selects a "yes" region 504, connection to the presented access point 131 is started, and when the user selects a "no" region 503, connection processing is not executed. Also, when the "select another access point" region 502 is selected, following the priority order in the connection candidate list, the next connection destination candidate is displayed and made selectable (not illustrated). For example, in the display of FIG. 5, the SSIDs "fghijk" 302, "abcde" 301, and "aaaaa" 306 which are the second and onward candidates in the connection candidate list of FIG. 3B are displayed in order and made selectable. Via the screens, the user is presented with the access point 131 to set for the communication apparatus 151 in the optimal order, and the user is made able to select. Herein, "optimal' refers to the access point with the strongest signal strength with respect to the communication apparatus 151 of the access points capable of communicating with the information processing apparatus 101.

Sequence of Network Setup Processing in Communication System

FIG. 6 is a sequence diagram illustrating the flow of the processing of the information processing apparatus 101, the communication unit 156 of the communication apparatus 151, and the access points AP 304 and 302 in the network setup processing described using FIG. 4. In the example described herein, the access points located in the surroundings of the communication apparatus 151 are the AP 304 with the SSID of "qrstu" and the AP 302 with the SSID of "fghijk" described using FIGS. 3A and 3B. As processing prior to the matter, the communication apparatus 151 accepts a predetermined operation from the user, transitions to the network setup mode, and operates (not illustrated). Regarding the transition to the network setup mode, a similar effect can be achieved when, instead of via a predetermined user operation, the transition automatically occurs w % ben the power of the communication apparatus 151 is turned on in a state in which the network setup has not been performed, for example.

When the network setup of the communication apparatus 151 is started up, in step S601, the AP search described with reference to FIG. 2 is executed to detect the surrounding access points. As the AP search result, the access points AP 304, AP 302, and the like located in the surroundings of the communication apparatus 151 are found, and a search result (FIG. 3B) including the search results arranged in order of priority is acquired.

In the example described herein, the information processing apparatus 101 has an infrastructure mode connection to the AP 302 in advance (not illustrated). When the setting application of the information processing apparatus 101 is started up by the user, in step S602, the infrastructure mode connection with the AP 302 is cut. Next, in step S603, an AP search is performed, and the surrounding access points and the communication apparatus 151 transitioned to network setup mode is detected. Next, a P2P connection is established in step S604 with the detected communication apparatus 151, and communication using SNMP is started.

Next, the processing proceeds to step S605, and the information processing apparatus 101 requests the WEC related information and acquires the information from the communication apparatus 151. Also, in step S606, the information processing apparatus 101 sends a request for the AP search result to the communication apparatus 151, and the communication apparatus 151 responds with the AP search result acquired in step S601. After the information processing apparatus 101 acquires all of the required information, in step S607, the P2P connection with the communication apparatus 151 is cut.

The communication apparatus 151 transitions to a DPP standby mode in step S608 on the basis of the WEC related information transmitted in step S605 and is put in a state in which the network settings can be set using DPP. The information processing apparatus 101 merges together the AP search result (FIG. 3B) acquired from the communication apparatus 151 in step S606 and the AP search result acquired by itself in step S603 and sets the priority order of the connection destination access points (not illustrated). The merge processing is processing such as that described in step S406. By setting the connection destination access point on the basis of the priority order acquired from the communication apparatus 151, information of an access point with a good communication environment or communication condition with the communication apparatus 151 can be provided. The communication environment may refer to the radio field intensity from the access point, for example.

Next, an infrastructure mode connection with the access point AP 304 with the highest priority order based on the merge result in step S609 is established, and the information processing apparatus 101 confirms that connection with the AP 304 is possible. Establishing an infrastructure mode connection is implemented using a function provided by the OS. Using the screen on the display unit 108 described using FIG. 5, the information processing apparatus 101 presents to the user the access point with the desired connection setting and establishes an infrastructure mode connection on the basis of the selected access point information. After the information processing apparatus 101 has confirmed that an infrastructure mode connection can be established with the desired access point, to implement DPP communication in the next step, in step S610, the information processing apparatus 101 cuts the infrastructure mode connection with the AP 304. In a case in which, as a function of the communication unit 110, a function that can simultaneously implement the infrastructure mode connection of step S609 and the DPP connection described in step S611 is provided, the cutting processing of step S610 is not necessary. Thereafter, in steps S611 to S614, the information processing apparatus 101 executes the DPP sequence with the communication apparatus 151.

In step S611, the information processing apparatus 101 establishes a DPP connection with the communication apparatus 151 in DPP standby mode on the basis of the WEC related information acquired in step S605. In the DPP connection, the information processing apparatus 101 operates as the configurator apparatus, and the communication apparatus 151 operates as the enrollee apparatus. In step S612, following the DPP architecture, DPP authentication is performed to create a shared key using the public key included in the WEC related information and a private key, for example. Next, in step S613, the information processing apparatus 101 functioning as the configurator apparatus executes DPP configuration processing to transmit information encrypted using the shared key. Note that the information transmitted here is connection information for the access point including the SSID, password, or the like that is required to connect to the AP 304 stored by the information processing apparatus 101. With the process described above, connection setting is performed for the communication apparatus 151 to connect to an access point.

When the series of DPP sequences starting at step S611 ends, the information processing apparatus 101 cuts the DPP connection in step S614. In step S615, the communication apparatus 151 establishes an infrastructure mode connection on the basis of the received connection information for the AP 304. Also, in step S616, the information processing apparatus 101 again establishes an infrastructure mode connection with the AP 304. Because the information processing apparatus 101 and the communication apparatus 151 both have an infrastructure mode connection to the AP 304, they are able to communicate with one another via the access point. The setting application of the information processing apparatus 101 confirms (not illustrated) that the series of network settings has been completed by confirming the communication with the communication apparatus 151. After confirmation, the information processing apparatus 101 may remove the connection with the AP 304. Thereafter, the communication apparatus 151 is able to communicate with a device connected to the communication network via the AP 304. For example, in a case in which the communication apparatus 151 is a printer, the device on the network can confirm and then use the printer.

Note that in a case in which the infrastructure mode connection has not been cut in step S610, the infrastructure mode connection is maintained. Thus, in step S616, the infrastructure mode connection does not need to be re-established. Also, because the information processing apparatus 101 is searching for an access point it is able to communicate with in step S601, the infrastructure mode connection of steps S609 and S610 need not be performed. Furthermore, the information processing apparatus 101 need not acquire the WEC related information by the method described above. For example, instead of executing the steps S401 to S404, the information processing apparatus 101 may read the barcode or QR code (registered trademark) displayed by the communication apparatus 151, or may acquire the WEC related information by performing NFC communication or Bluetooth communication with the communication apparatus 151. This also applies to the second embodiment. Note that a mode of acquiring the WEC related information by performing Bluetooth communication will be described in the second embodiment. Also, only one of confirming the infrastructure mode connection in step S408 and merging the AP search results in step S406 may be performed. This also applies to the second embodiment.

As described above, the setting application of the information processing apparatus 101 performs network setting of the communication apparatus 151 on the basis of an AP search of the communication apparatus 151, allowing a network setting appropriate for the communication apparatus 151 to be implemented.

More specifically, the information processing apparatus 101 can acquire a list of access points with a good communication environment from the communication apparatus 151. The information processing apparatus 101 can present, to the user, access points from this list which are connection partner candidates and make the user select one. Accordingly, the information processing apparatus 101 can transmit the connection information of the selected access point to the communication apparatus 151 using DPP, and the communication apparatus 151 can connect to the access point using an infrastructure mode. In the list of the access points transmitted to the information processing apparatus 101 by the communication apparatus 151, the access points are arranged in order of how good their communication environment with the communication apparatus 151 is. This allows the user to be presented with the access point with a good communication environment with the communication apparatus 151 to be ordered from best downward.

Note that in the example described above, the vulnerability of the access point is determined by the communication terminal, but this may be determined by the information processing apparatus that has received the results of an AP search. For example, the result of an AP search with the authentication method or the encryption method associated together with the access point may be transmitted from the communication terminal to the information processing terminal, and the information processing terminal may determine the vulnerable access points using the method described above. In this case, the access points determined to be vulnerable are removed from being candidates for an access point to be a connection partner with the communication terminal.

Second Embodiment

The first embodiment described above is an example in which the information processing apparatus 101 and the communication units 110 and 156 of the communication apparatus 151 are used as units for P2P communication that passes along the WEC related information. However, in the present embodiment, the short-range communication units 111 and 157 are used. The present embodiment described herein is an example in which BLE is used as the communication method for the short-range communication units 111 and 157. However, the effect of the present embodiment can be achieved by using a different short-range communication unit. With the BLE standard established by Bluetooth SIG, communication is performed using Generic Attribute Profile (hereinafter, referred to as GATT). A GATT client performs communication by the presence and state of the GATT server being confirmed and a GATT connection being made after receiving advertising information that is output via beacon by a GATT server. When a GATT connection is established, the GATT client reads a GATT database provided by the GATT server, issues a write request, and exchanges information via a response of the GATT server. The characteristics, which are the items of information of the GATT database, are in a state of being able to be identified with a universally unique identifier (UUID). A read or write attribute and a security attribute indicating whether or not the data is encrypted can be set for each characteristic. In the present embodiment, the communication apparatus 151 is the GATT server, and the information processing apparatus 101 is the GATT client. This allows P2P communication to be implemented.

FIG. 7 is a diagram illustrating an example of characteristic information provided by the communication apparatus 151 as a GATT database. WEC related information 701 is set with a read attribute and with encryption and includes the WEC related information described above, such as the DPP connection information, the public key, and the like. A station (STA) state 702 is set with a read attribute and not with encryption and indicates the state of the communication unit 156, and whether STA has transitioned to a DPP standby state can be determined. A DPP transition request 703 is set with a write attribute, and, by writing a specific value to the characteristic, a request can be issued to the communication apparatus 151 to transition to a DPP state. A connection state 704 is set with a read attribute, and the connection state between the communication unit 156 of the communication apparatus 151 and the access point can be read. An AP search result 705 is set with a read attribute, and the result of the AP search performed by the communication apparatus 151 can be read in a state with a priority order added to the access points.

Sequence of Network Setup Processing in Communication System (Second Embodiment)

Figure 8:
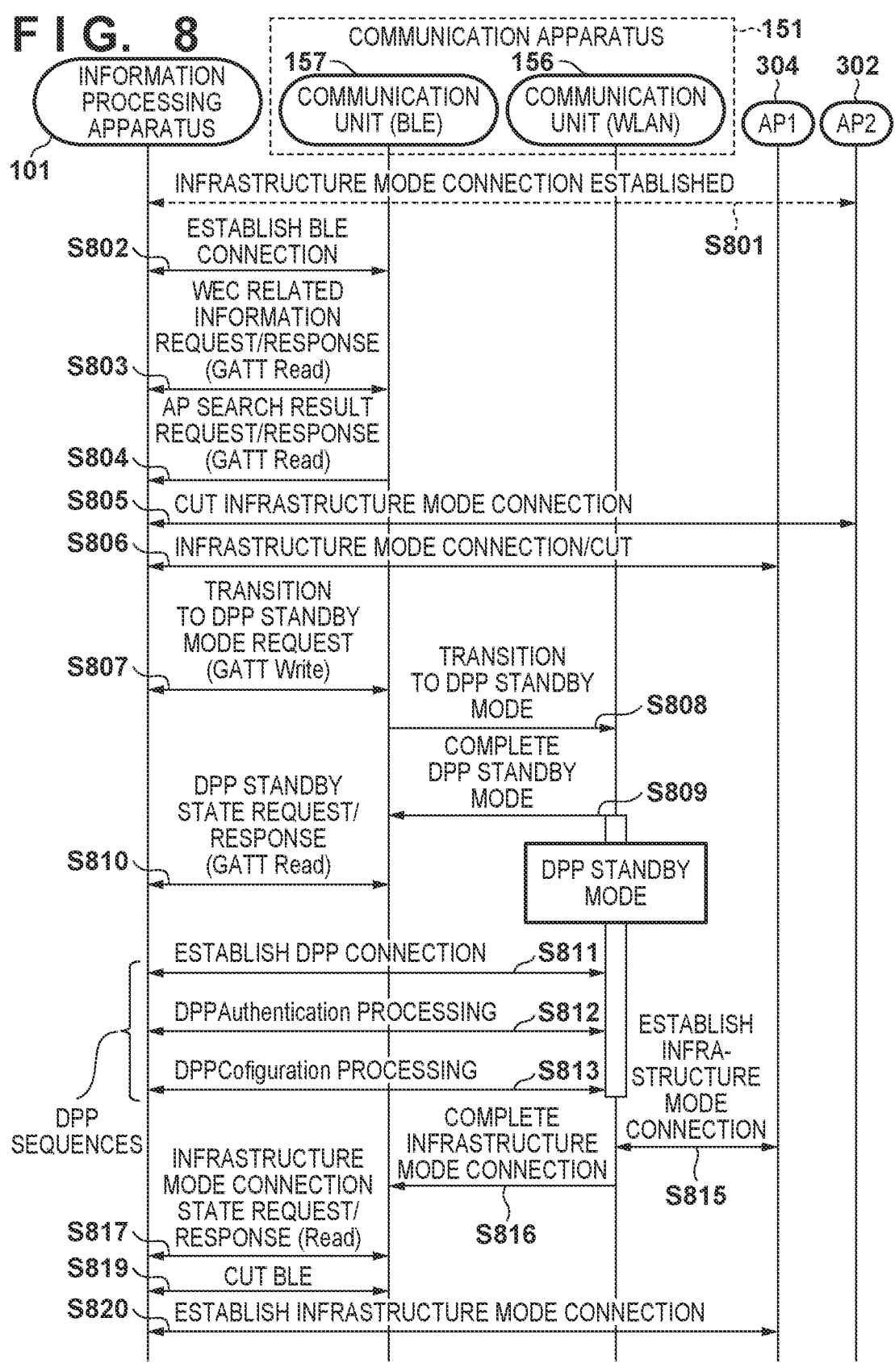
FIG. 8 is a sequence diagram indicating the processing in the case of implementing WEC related information via short-range communication.

FIG. 8 is a sequence diagram illustrating the flow of the processing of the information processing apparatus 101, the communication apparatus 151, and the access points AP 304 and 302. The communication apparatus 151 performs communication using the short-range communication unit 157 and the communication unit 156, and the information processing apparatus 101, though not illustrated, performs communication using the short-range communication unit 111 and the communication unit 110. In the example described herein, the information processing apparatus 101 is in a state of already being having an infrastructure mode connection to the AP 302 (step S801).

In the communication apparatus 151, the not-illustrated network setup mode starts up and an AP search is performed by the communication unit 156. As the AP search result, the information of FIG. 3B is acquired, and this information is stored in the AP search result 705 of the GATT database. The short-range communication unit 157 of the communication apparatus 151 outputs a beacon at a specific cycle, with the information indicating a network setup enabled state being included in the advertising information. In a network setup disabled state, by changing the information included in the advertising information, the surrounding communication devices can be informed of the setup enabled/disabled state. Other than that described above, the method of informing of the enabled/disabled state of the communication apparatus 151 used may be implemented by presenting it using a connectable mode that indicates whether GATT communication is enable or disabled and a non connectable mode when setting is disabled.

When the setting application of the information processing apparatus 101 starts up, in step S802, the short-range communication unit 111 is used to acquire the advertising information output by the communication apparatus 151, a BLE connection is established, and a GATT communication enabled state is entered. Because the BLE connection uses the short-range communication units 111 and 157, which are separate devices to the communication units 110 and 156 that perform network setup, the BLE connection enables communication, independent of the setup processing. Next, in step S803, a read request is issued to the WEC related information 701 via GATT communication, and information is acquired by receiving a response. Furthermore, in step S804, the AP search result 705 is read via GATT communication.

The setting application of the information processing apparatus 101 extracts the access points with setting enabled by merging the received AP search result 705 (FIG. 3B) of the communication apparatus 151 and the AP search result performed by itself. Then, the extracted access points are arranged in order from best communication condition (communication environment) with the communication apparatus 151. Herein, merge is the processing described in step S406. In this example of the present embodiment, the optimal access point is the AP 304 different from the AP 302 already connected to the information processing apparatus 101. In this case, in step S805, the infrastructure mode connection with the currently connected AP 302 is cut. Next, in step S806, the information processing apparatus 101 confirms that connection to the AP 304, which is the optimal access point, is possible, and then makes an infrastructure mode connection to the AP 304 and confirms that the stored connection information for the access point is functioning correctly. After confirming that the connection information for the access point is correct, the infrastructure mode connection with the AP 304 is temporarily cut.

Next, in step S807, the information processing apparatus 101 writes a specific value "Start" to the DPP transition request 703 of the GATT database included in the communication apparatus 151 via GATT communication. This makes the communication apparatus 151 transition to the DPP standby mode. The communication apparatus 151 receives the transition request, and then in step S808, the communication apparatus 151 requests for the communication unit 156 to transition to the DPP standby mode. When the communication unit 156 of the communication apparatus 151 has finished transitioning to the DPP standby mode, in step S809, that the transitioning to the DPP standby mode is reported to the short-range communication unit 157. Accordingly, the value of the STA state 702 of the GATT database is changed to the contents of the completed transition to the DPP standby state.

In step S810, the information processing apparatus 101 reads the value of the STA state 702 via GATT communication and determines whether or not the communication apparatus 151 is transitioning to the DPP standby state. After the transition request of step S807 is issued, reading processing is executed continuously a number of time until DPP standby mode transition completion is confirmed, and then synchronization is performed for the next DPP connection. The information processing apparatus 101 confirms that the communication apparatus 151 has transitioned to the DPP standby mode and then, in step S811, establishes a DPP connection on the basis of the received WEC related information 701. Next in step S812, device authentication and communication data encryption is performed via DPP authentication processing. Then in step S813, DPP configuration processing is executed and connection information for connecting to the AP 304, which is the connection target access point, to transmitted to the communication apparatus 151. When the series of DPP sequences starting at step S811 ends, the information processing apparatus 101 cuts the DPP connection (not illustrated).

In step S815, the communication apparatus 151 establishes an infrastructure mode connection with the AP 304 on the basis of the connection information received in step S813. This connection processing is a connection compliant with IEEE 802.11 standard performed on the basis of the received connection information, and thus a description thereof is omitted. When the communication unit 156 of the communication apparatus 151 completes the infrastructure mode connection, in step S816, notifies that short-range communication unit 157 of infrastructure mode connection completion, and the notification changes the value of the connection state 704 of the GATT database to a connection complete state.

In S817, the information processing apparatus 101 reads the value of the connection state 704 via GATT communication and confirms that the communication apparatus 151 has completed infrastructure mode connection with the AP 304. The reading processing is executed after the series of DPP sequences ends and is periodically executed until completion of the infrastructure mode connection of the communication apparatus 151 is confirmed. The setting application of the information processing apparatus 101 confirms that the infrastructure mode connection of the communication apparatus 151 is complete and then, in step S819, cuts the BLE connection. Then, in step S820, an infrastructure mode connection with the AP 304 is re-established, and communication with the communication apparatus 151 via the AP 304 is enabled.

As described above, by the bootstrapping processing and the state management of the information processing apparatus 101 and the communication apparatus 151 being executed using a short-range communication different from WLAN communication, network setting processing that takes into account security and is highly user-friendly can be implemented.

Also, effects similar to that of the first embodiment are achieved. In other words, the information processing apparatus 101 can acquire a list of access points with a good communication environment from the communication apparatus 151. The information processing apparatus 101 can present, to the user, access points from this list which are connection partner candidates and make the user select one. Accordingly, the information processing apparatus 101 can transmit the connection information of the selected access point to the communication apparatus 151 using DPP, and the communication apparatus 151 can connect to the access point using an infrastructure mode. In the list of the access points transmitted to the information processing apparatus 101 by the communication apparatus 151, the access points are arranged in order of how good their communication environment with the communication apparatus 151 is. This allows the user to be presented with the access point with a good communication environment with the communication apparatus 151 to be ordered from best downward.

Other Embodiments

Note that in the embodiment described above, a first search result acquired by an AP search by the communication apparatus and a second search result acquired by an AP search by the information processing apparatus are merged, meaning that it is narrowed down to common APs. However, a connection candidate AP may be decided on the basis of only the first search result acquired by an AP search by the communication apparatus. Also, the information processing apparatus is connected in advance to the AP with the highest priority order from among the connection candidate APs, but this may be omitted. Also, after the communication apparatus establishes a connection with the AP, the information processing apparatus is connected to that AP. However, the AP which the information processing apparatus connects to may be another AP as long as communication is possible with the AP which the communication apparatus is connected to. Also, in the embodiment described above, WEC and DPP are used a protocols for connecting the communication apparatus to an AP. However, another protocol may be used as long as the communication apparatus can connect to the AP selected from among the APs discovered by the communication apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-176825, filed Oct. 28, 2021 which is hereby incorporated by reference herein in its entirety.

What is claimed is:

1. A control method for an information processing apparatus capable of communicating with a communication apparatus and an access point, comprising:

receiving, via a direct wireless connection between the communication apparatus and the information processing apparatus by using a first protocol, a first search result which is a result acquired via a search for access points performed by the communication apparatus, the first protocol being Simple Network Management Protocol (SNMP);

acquiring a second search result which is a result acquired via a search for access points performed by the information processing apparatus;

generating, by comparing the first search result and the second search result and deleting one or more access points included in either one of the first search result and the second search result and not included in the other one of the first search result and the second search result, a list including access points commonly included in both the first search result and the second search result, the list being ordered according to priorities of the access points determined based on signal strengths of signals from the access points measured by the communication apparatus;

notifying, in a case where the generated list does not include any access point as a result of the deleting, a user that a network setting has failed;

attempting, in a case where the generated list includes at least one access point as a result of the deleting, to establish a connection between a first access point contained at a highest priority in the list and the information processing apparatus;

attempting to establish a connection between the information processing apparatus and a second access point contained in the list, the second access point having a priority lower than that of the first access point and being an access point to which the information processing apparatus has not attempted to establish a connection, in a case in which establishing a connection with the first access point fails; and performing, based on the establishment of the connection between an access point included in the list and the information processing apparatus, processing for transmitting, to the communication apparatus, connection information for connecting to the access point by using a second protocol between the communication apparatus and the information processing apparatus, the second protocol being Device Provisioning Protocol (DPP) which is different from the first protocol.

2. The control method according to claim 1, wherein a connection between the selected first access point and the information processing apparatus is attempted to be established before the connection information is transmitted to the communication apparatus.

3. The control method according to claim 1, wherein the information processing apparatus is controlled such that an access point with a predetermined encryption method is not included in the first search result.

4. The control method according to claim 1, wherein the information processing apparatus is controlled such that an access point with a predetermined frequency band is not included in the first search result.

5. The control method according to claim 1, wherein the communication apparatus is a printer.

6. An information processing apparatus capable of communicating with a communication apparatus and an access point, comprising:

at least one processor; and at least one memory comprising at least one program, wherein the at least one program is configured to cause the at least one processor to perform:

receiving, via a direct wireless connection between the communication apparatus and the information processing apparatus by using a first protocol, a first search result which is a result acquired via a search for access points performed by the communication apparatus, the first protocol being Simple Network Management Protocol (SNMP), acquiring a second search result which is a result acquired via a search for access points performed by the information processing apparatus, generating, by comparing the first search result and the second search result and deleting one or more access points included in either one of the first search result and the second search result and not included in the other one of the first search result and the second search result, a list including access points commonly included in both the first search result and the second search result, the list being ordered according to priorities of the access points determined based on signal strengths of signals from the access points measured by the communication apparatus, notifying, in a case where the generated list does not include any access point as a result of the deleting, a user that a network setting has failed, attempting, in a case where the generated list includes at least one access point as a result of the deleting, to establish a connection between a first access point contained at a highest priority in the list and the information processing apparatus, attempting to establish a connection between the information processing apparatus and a second access point contained in the list, the second access point having a priority lower than that of the first access point and being an access point to which the information processing apparatus has not attempted to establish a connection, in a case in which establishing a connection with the first access point fails, and performing, based on the establishment of the connection between an access point included in the list and the information processing apparatus, processing for transmitting, to the communication apparatus, connection information for connecting to the access point by using a second protocol between the communication apparatus and the information processing apparatus, the second protocol being Device Provisioning Protocol (DPP) which is different from the first protocol.

7. A non-transitory computer-readable medium storing at least one program, wherein the program causes a computer capable to communicating with a communication apparatus and an access point to receive, via a direct wireless connection between the communication apparatus and the information processing apparatus by using a first protocol, a first search result which is a result acquired via a search for access points performed by the communication apparatus, the first protocol being Simple Network Management Protocol (SNMP), acquire a second search result which is a result acquired via a search for access points performed by the information processing apparatus, generate, by comparing the first search result and the second search result and deleting one or more access points included in either one of the first search result and the second search result and not included in the other one of the first search result and the second search result, a list including access points commonly included in both the first search result and the second search result, the list being ordered according to priorities of the access points determined based on signal strengths of signals from the access points measured by the communication apparatus, notify, in a case where the generated list does not include any access point as a result of the deleting, a user that a network setting has failed, attempt, in a case where the generated list includes at least one access point as a result of the deleting, to establish a connection between a first access point contained at a highest priority in the list and the information processing apparatus, attempt to establish a connection between the information processing apparatus and a second access point contained in the list, the second access point having a priority lower than that of the first access point and being an access point to which the information processing apparatus has not attempted to establish a connection, in a case in which establishing a connection with the first access point fails, and perform, based on the establishment of the connection between an access point included in the list and the information processing apparatus, processing for transmitting, to the communication apparatus, connection information for connecting to the access point by using a second protocol between the communication apparatus and the information processing apparatus, the second protocol being Device Provisioning Protocol (DPP) which is different from the first protocol.

8. The method according to claim 1, further comprising acquiring predetermined information for communication with the communication apparatus by the DPP from the communication apparatus via a communication with the SNMP between the communication apparatus and the information processing apparatus, wherein the processing for transmitting the connection information to the communication apparatus is performed using the predetermined information.

9. The method according to claim 1, further comprising:

disconnecting the connection between the access point included in the list and the information processing apparatus;

transmitting, after the disconnection, the connection information to the communication apparatus by the DPP and re-establishing, after the transmitting the connection information, the connection between the access point included in the list and the information processing apparatus.

10. The method according to claim 1, further comprising:

removing, based on a failure to establish the connection with the first access point, the first access point from the list.

11. The control method according to claim 1, wherein the direct wireless connection between the communication apparatus and the information processing apparatus is established by an access point function of the communication apparatus operating as a setup access point, the setup access point requiring no password for connection.

12. The control method according to claim 11, wherein an SSID of the setup access point includes a predetermined character string recognizable by a setup application running on the information processing apparatus.

13. The control method according to claim 12, further comprising deactivating the setup access point after a predetermined period of time has elapsed since the setup access point was activated.

14. The control method according to claim 1, further comprising:

displaying, on a display of the information processing apparatus, identification information of the first access point contained at the highest priority in the list; and receiving, from a user, an input for permitting the information processing apparatus to attempt to establish the connection with the first access point.

15. The control method according to claim 14, further comprising:

in response to receiving, from the user, an input for selecting another access point, displaying identification information of a next access point in the list having a priority lower than that of the first access point, and attempting to establish the connection between the information processing apparatus and the next access point based on a user selection.

16. The control method according to claim 1, wherein the connection information includes at least an SSID and a password of the access point included in the list.

17. The control method according to claim 1, further comprising:

after transmitting the connection information to the communication apparatus by the DPP, and after re-establishing the connection between the access point included in the list and the information processing apparatus, checking, via the access point, whether an infrastructure connection between the communication apparatus and the access point has been established, and notifying the user that the network setting has been completed when the infrastructure connection has been established.

18. The control method according to claim 1, wherein the communication apparatus is a printer having no user interface capable of receiving a user operation for selecting an access point.

19. The control method according to claim 1, wherein, in the list including the access points commonly included in both the first search result and the second search result, an access point whose security is determined to be vulnerable based on at least one of an authentication method and an encryption method is excluded.

\* \* \* \* \*